United States Patent
Forster et al.

(10) Patent No.: US 10,248,279 B2
(45) Date of Patent: Apr. 2, 2019

(54) TASK COMPLETION ACROSS DEVICES USING A SHARED WORK SPACE

(71) Applicant: Microsoft Technology Licensing, LLC, Redmond, WA (US)

(72) Inventors: Rowan Forster, Seattle, WA (US); Susan Chory, Seattle, WA (US); Jason Nelson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 786 days.

(21) Appl. No.: 14/489,022

(22) Filed: Sep. 17, 2014

(65) Prior Publication Data
US 2016/0077674 A1    Mar. 17, 2016

(51) Int. Cl.
*G06Q 10/10* (2012.01)
*G06F 3/0481* (2013.01)
*H04L 12/58* (2006.01)

(52) U.S. Cl.
CPC ......... *G06F 3/0481* (2013.01); *G06Q 10/101* (2013.01); *G06Q 10/103* (2013.01); *H04L 51/04* (2013.01)

(58) Field of Classification Search
CPC .. G06F 3/0481; G06F 9/44563; G06F 9/4445; G06F 3/1454; G06F 9/547; H04L 51/04; H04L 12/1813; G06Q 10/101; G06Q 10/103; H04N 7/15
See application file for complete search history.

(56) References Cited

U.S. PATENT DOCUMENTS

| | | | |
|---|---|---|---|
| 7,620,610 B2 | 11/2009 | Macbeth et al. | |
| 8,473,949 B2 | 6/2013 | Horvitz et al. | |
| 8,478,276 B1 | 7/2013 | Koren et al. | |
| 9,336,209 B1* | 5/2016 | Gupta | G06Q 10/101 |
| 2005/0091289 A1* | 4/2005 | Shappell | G06F 17/30067 |
| 2007/0282990 A1 | 12/2007 | Kumar et al. | |
| 2009/0204966 A1 | 8/2009 | Johnson et al. | |

(Continued)

OTHER PUBLICATIONS

"The best photo apps for keeping your memories in the cloud" (published on Aug. 29, 2013 by Casey Newton and Ellis Hamburger) http://www.theverge.com/2013/8/29/4560364/best-cloud-storage-photo-apps.*

(Continued)

*Primary Examiner* — Rinna Yi
(74) *Attorney, Agent, or Firm* — Mark K. Young; Mayer & Williams PC

(57) ABSTRACT

A shared work space application provides a work space that is commonly accessible across devices and applications so that a user can select and drop items into the shared work space and then pick them up again later using the same or different devices and applications. The shared work space application can use available inputs and data to surface contextually-relevant reminders to the user that there are items in the shared work space that he or she has not finished using. A task or project can be completed from within a variety of different applications and devices using the shared work space and items can be combined into a single object for sharing with one or more of the user's contacts. The shared work space application can also provide a convenient launch point into other communication applications and sharing experiences.

16 Claims, 16 Drawing Sheets

(56) References Cited

U.S. PATENT DOCUMENTS

| | | | |
|---|---|---|---|
| 2013/0036117 A1* | 2/2013 | Fisher | G06F 17/30029 707/736 |
| 2013/0103447 A1* | 4/2013 | Melander | G06Q 10/00 705/7.15 |
| 2014/0026181 A1 | 1/2014 | Kiang et al. | |
| 2014/0047349 A1* | 2/2014 | Kulkarni | G06F 3/0482 715/739 |
| 2014/0082136 A1 | 3/2014 | Garcia Puga et al. | |
| 2014/0108486 A1 | 4/2014 | Borzycki et al. | |
| 2014/0141714 A1 | 5/2014 | Ghosh et al. | |
| 2016/0334967 A1* | 11/2016 | Rottler | G06Q 10/10 |

OTHER PUBLICATIONS

"International Search Report and Written Opinion Issued in PCT Application No. PCT/US2015/049880", dated Nov. 17, 2015, (10 Pages total).

"International Preliminary Report on Patentability Issued in PCT Application No. PCT/US2015/049880", dated Sep. 19, 2016, (6 Pages total).

Pyla, et al., "Continuous User Interfacesfor Seamless Task Migration", In Proceedings of the 13th International Conference on Human-Computer Interaction. Part III: Ubiquitous and Intelligent Interaction, Jul. 19, 2009, (10 pages total).

Tungare, et al., "Syncables: A Framework to Support Seamless Data Migration Across Multiple Platforms", In Proceedings of IEEE International Conference on Portable Information Devices, May 25, 2007, (5 pages total).

Paterno, et al., "Ambient Intelligence for Supporting Task Continuity across Multiple Devices and Implementation Languages", The Computer Journal Advance Access, vol. 53, Issue 8, Oct. 2010, (19 pages total).

Chang, et al., "Deep Shot: A Framework for Migrating Tasks Across Devices Using Mobile Phone Cameras", In Proceedings of the SIGCHI Conference on Human Factors in Computing Systems, May 7, 2011, (10 pages total).

"iOS 8 Preview", Published on: Jun. 3, 2014 Retrieved from: https://www.apple.com/ios/ios8/continuity/ Retrieved on: Jun. 30, 2014 (5 pages total).

Koren, et al., "Session Mobility for Collaborative Pervasive Apps Using XMPP", In Proceedings of IEEE International Conference on Pervasive Computing and Communications Workshops, Mar. 18, 2013, (6 pages total).

"Second Written Opinion Issued in PCT Application No. PCT/US2015/049880", dated Mar. 31, 2016, 5 Pages.

"Office Action Issued in European Patent Application No. 15771833.9", dated Mar. 27, 2018, 7 Pages.

* cited by examiner

TASK COMPLETION ACROSS DEVICES USING A SHARED WORK SPACE

BACKGROUND

Users frequently rely on the capabilities of multiple communication applications (e.g., messaging, calling, chatting, and video, etc.) and/or devices (e.g., smartphones, tablets, personal computers, etc.) to complete a particular task. They sometimes also start a task on one device and pick it up later on another device. Currently, there is no easy way to start and finish projects across a variety of different tasks, applications, and devices.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A shared work space application provides a work space that is commonly accessible across devices and applications so that a user can select and drop items into the shared work space and then pick them up again later using the same or different devices and applications. The shared work space application can use available inputs and data to surface contextually-relevant reminders to the user that there are items in the shared work space that he or she has not finished using. A task or project can be completed from within a variety of different applications and devices using the shared work space and items can be combined into a single object for sharing with one or more of the user's contacts. The shared work space application can also provide a convenient launch point into other communication applications and sharing experiences.

In an illustrative example, while out on a walk a user may receive a message from a contact (e.g., a friend, colleague, family member, etc.) on a mobile device such as a smartphone. The message can include a link to a product being sold on a website. The user does not want to spend time right then to review the message's details and attempt to go through linked shopping pages on the smartphone's small screen, so the user drops the email message into the shared work space. Later, when the user is on a lunch break at work and using a tablet having a big screen, the shared work space application surfaces a reminder on the tablet to let her know that the email message with the product link is in the shared work space and awaiting further action. The shared work space application can use contextual data such as the type of device that is currently being used, the time of day, the user's location, the user's calendar/schedule/to do list, applications being utilized, and the like so that a reminder is provided at an advantageous time when the user is likely able to finish the task. In this example, the shared work space application uses the contextual data to determine that the user is presently better equipped to view the shopping website on the larger tablet device, is on a break, and does not have any other scheduled tasks or activities until later, so it is a good time to remind her about the earlier email message and product link.

In another illustrative example, the shared work space application may recognize that some information that the user needs to finish a task/project is presently available and thus can generate and surface the reminder to the user. For example, the user may receive a message from a contact that provides a requested meeting start time and location, so the user is able to finish a meeting invitation that she started working on earlier in the day and send it to the attendees.

Returning to the online shopping example, when she gets the reminder, the user follows the link in the message in the shared work space to view the shopping site's web pages on the tablet. After looking at pictures, descriptions, and customer reviews, she launches an email application from within the shared work space experience to forward the message and link to another contact. Later that day while using the tablet on the subway ride back home after work, the user watches some videos sent to her by a friend and she uses the shared work space application to merge them into a single highlight reel that she can place on her social media page.

After the user completes the video task, she opens an email and calendar application to review upcoming appointments. Recognizing that the email and calendar application has been launched, the shared work space application uses that context and surfaces a reminder on the tablet that the user had placed an earlier text message from a friend asking for an address for a party into the shared work space. The user moves the text from the message into her appointment calendar and then easily pulls together all the party details using items from the shared work space into an invitation that she sends to her friend in an email so that the friend has all the information in one place.

Advantageously, the shared work space application provides a universal and consistent navigation experience among multiple different communication applications that makes it easier for users to manage and complete tasks and projects. Use of contextual data enables the reminders to be surfaced at times when the tasks are able to be completed. Users can thus be expected to find the contextually-relevant reminders to be particularly useful as compared to conventional reminders that can often be surfaced arbitrarily and therefore be perceived as an annoyance rather than being helpful.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated. It is emphasized that the particular UIs displayed in the drawings can vary from what is shown according to the needs of a particular implementation.

DETAILED DESCRIPTION

Figure 1:
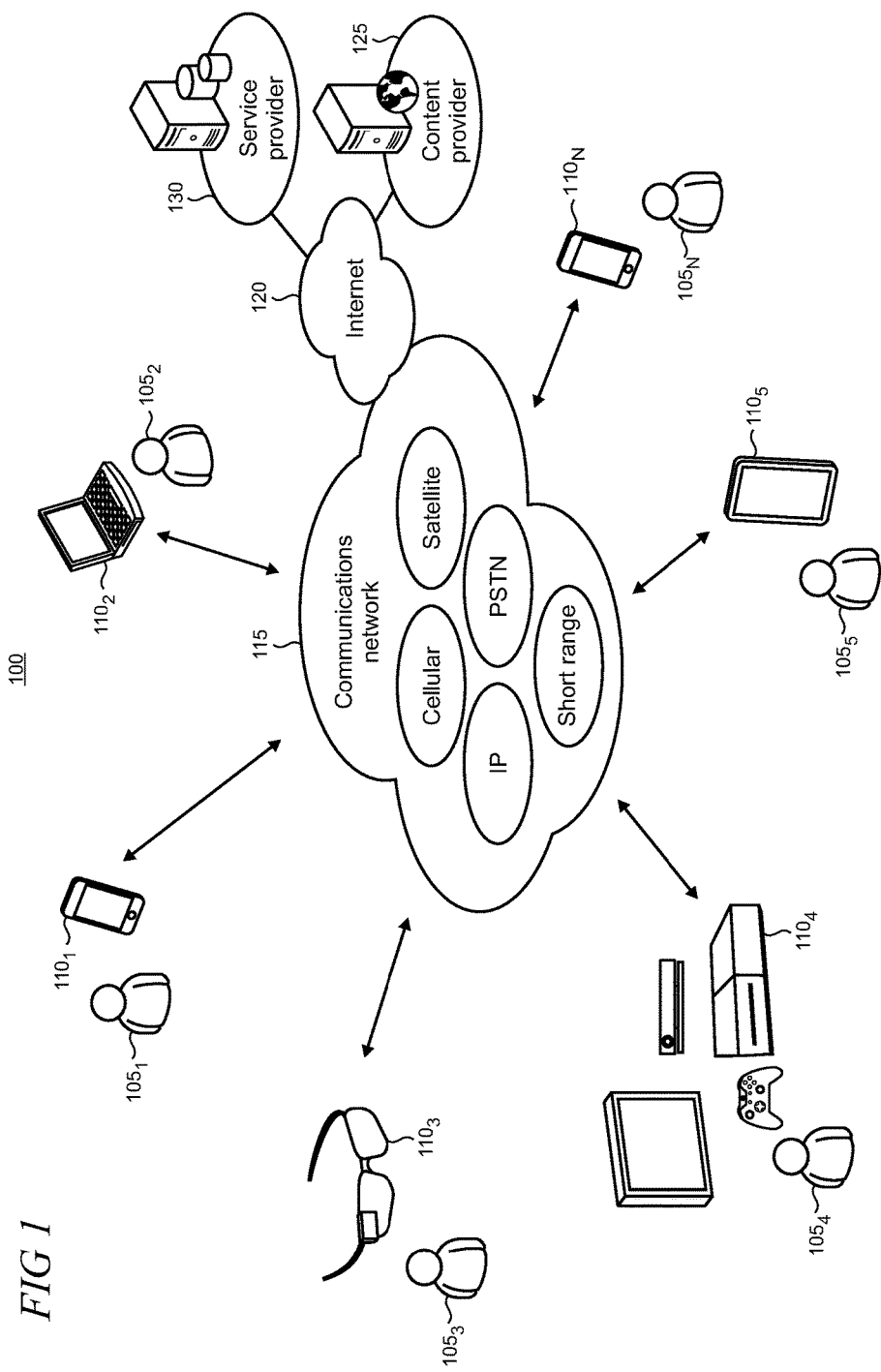
FIG. 1 shows an illustrative environment in which devices having communications capabilities interact over a network.

FIG. 1 shows an illustrative communications environment 100 in which various users 105 employ respective devices 110 that communicate over a communications network 115. The devices 110 provide various communication capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting), use applications and access services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and access a service provider 130 in some cases.

Figure 2:
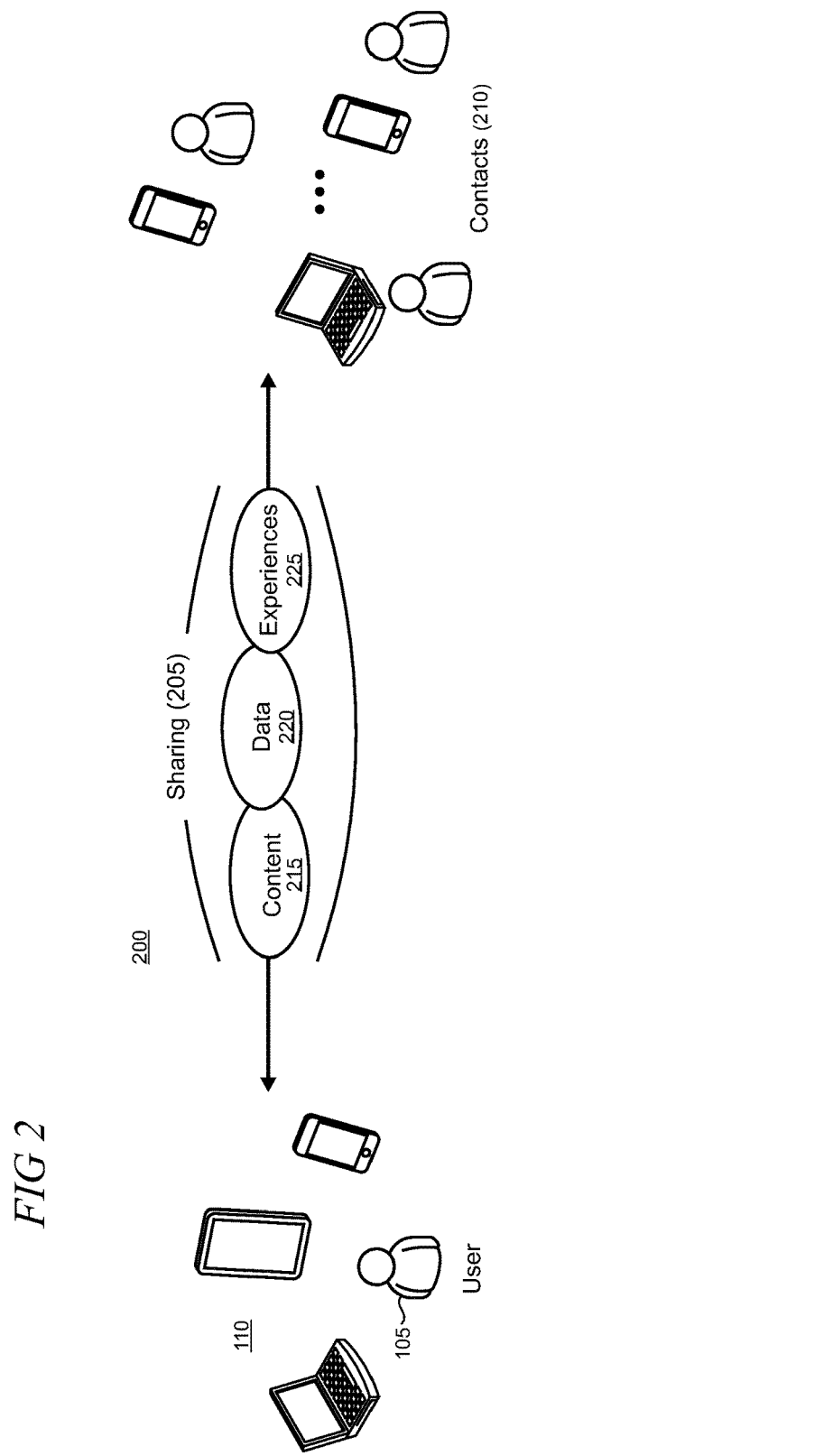
FIG. 2 shows illustrative sharing between device users.

FIG. 2 shows an illustrative arrangement 200 in which a user can employ multiple devices 110 in order to participate in sharing 205 with one or more contacts 210 over the network 115 (FIG. 1). For example, content 215 (e.g., files, media, video, television and movies, audio, songs, pictures, photos, contact information, location, directions, etc.), data 220, and experiences 225 (messaging, voice and video calling, watching shows, playing games, collaborating on a project, etc.) can be shared and the sharing can go in both directions between the user and a contact in some cases.

Figure 3:
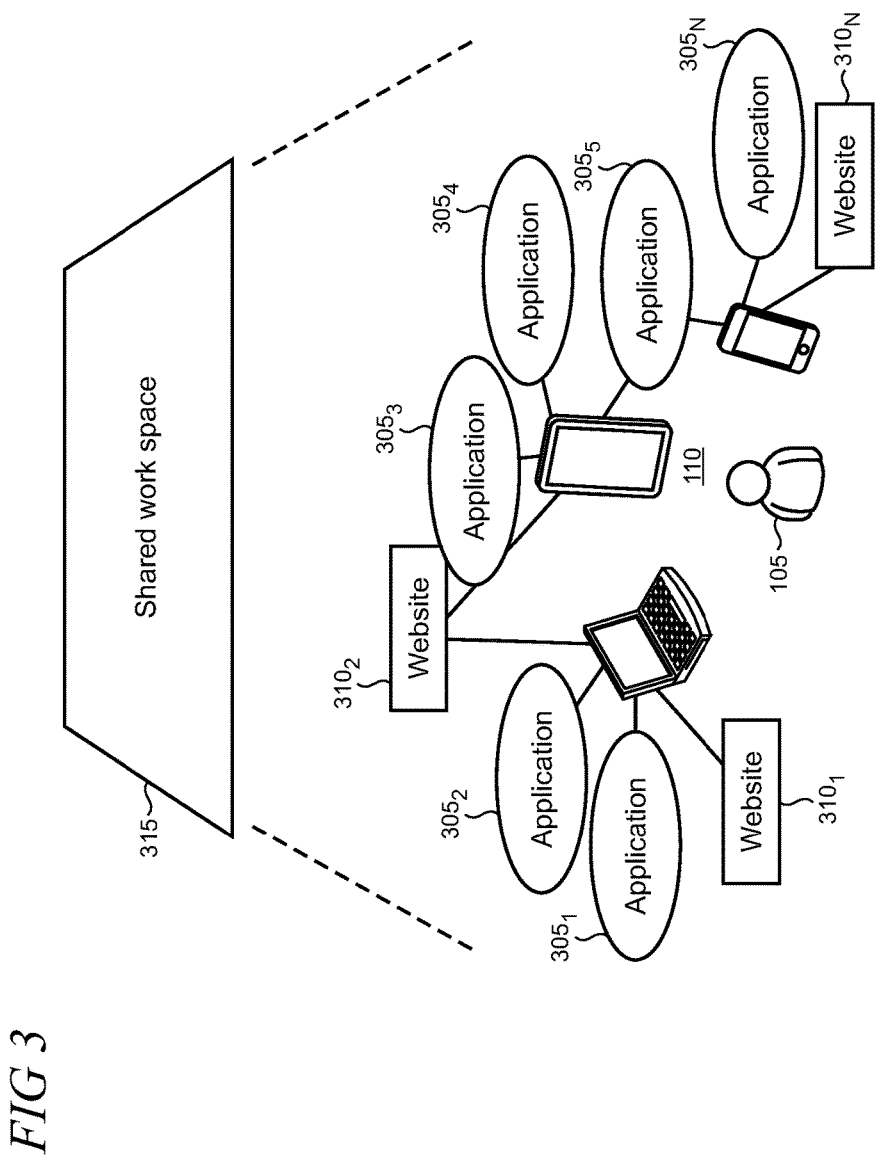
FIG. 3 shows a user employing multiple devices, applications, and websites that may be configured to utilize the present task completion across devices using a shared work space.

As shown in FIG. 3, a user 105 can typically use multiple applications 305 and/or access websites 310 across multiple devices 110 and the user often will switch among communication applications and devices to complete a given task or project or finish a conversation or other experience. For example, a user may need to access information from one application to use in another application. In addition, in some cases it may be harder to complete a task on a given device (e.g., due to display screen size, resource availability such as processing power, memory, storage capacity, etc.), or the user changes her environment (e.g., she leaves work and switches from a desktop PC to a mobile device such as a smartphone or tablet while on the subway ride home).

The present shared work space application implements a shared work space 315 that provides a centralized and commonly shared resource with which communication applications, websites, and/or other data/items/assets may interact. The shared work space application exposes a user interface (UI) that provides a universal and consistent navigation experience and enables the user to drop items into the shared work space 315 from any of the applications 305 and websites 310 on any device 110 and complete tasks/projects using those items using any application from any device.

Figure 4:
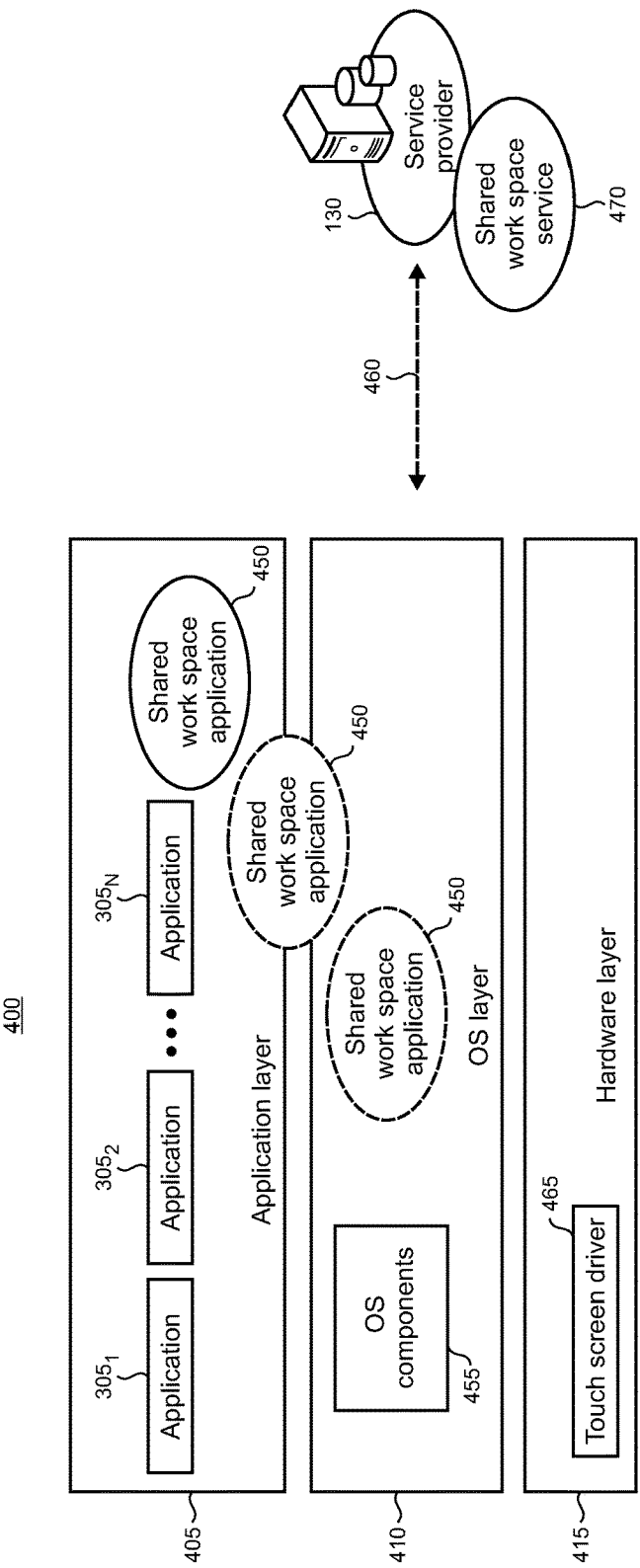
FIG. 4 shows an illustrative layered architecture that includes an application layer, operating system (OS) layer, and hardware layer.

The shared work space application may be implemented using components that are instantiated on a given device 110. FIG. 4 shows an illustrative layered architecture 400 that supports communication applications and other components. The architecture 400 is typically implemented in software, although combinations of software, firmware, and/ or hardware may also be utilized in some cases. The architecture 400 is arranged in layers and includes an application layer 405, an OS (operating system) layer 410, and a hardware layer 415. The hardware layer 415 provides an abstraction of the various hardware used by the device 110 (e.g., input and output devices, networking and radio hardware, etc.) to the layers above it. For example, a device 110 may utilize a touch screen driver 465 in the hardware layer 415 to facilitate user input.

The application layer 405 in this illustrative example supports various applications (apps) 305 (e.g., web browser, map application, and communication applications such as email, messaging, chatting, calling, blogging, etc.) and the shared work space application 450. The applications 305 and 450 are often implemented using locally executing code. However in some cases, these applications may rely on services and/or full or partial remote code execution provided by remote servers or other computing platforms such as those supported by the service provider 130 or other cloud-based resources as indicated by line 460. For example, the service 130 can expose a shared work space service 470 that can interoperate with the shared work space application 450. In some implementations, the shared work space service 470 can be configured as a web service and interact with a browser application or other client application to support a shared work space experience for the user.

While the apps 305 and 450 are shown here as components that are instantiated in the application layer 405, it may be appreciated that the functionality provided by a given application may be implemented, in whole or part, using components that are supported in either the OS or hardware layers. The shared work space application 450 may alternatively be instantiated using elements in both the OS and application layers or be configured as a component that is solely instantiated in the OS layer, as shown in FIG. 4 using the dashed ovals. The OS layer 410 supports OS components 455 with which the shared work space application may interact and/or utilize as may be needed to implement the various features and functions described herein.

Figure 5:
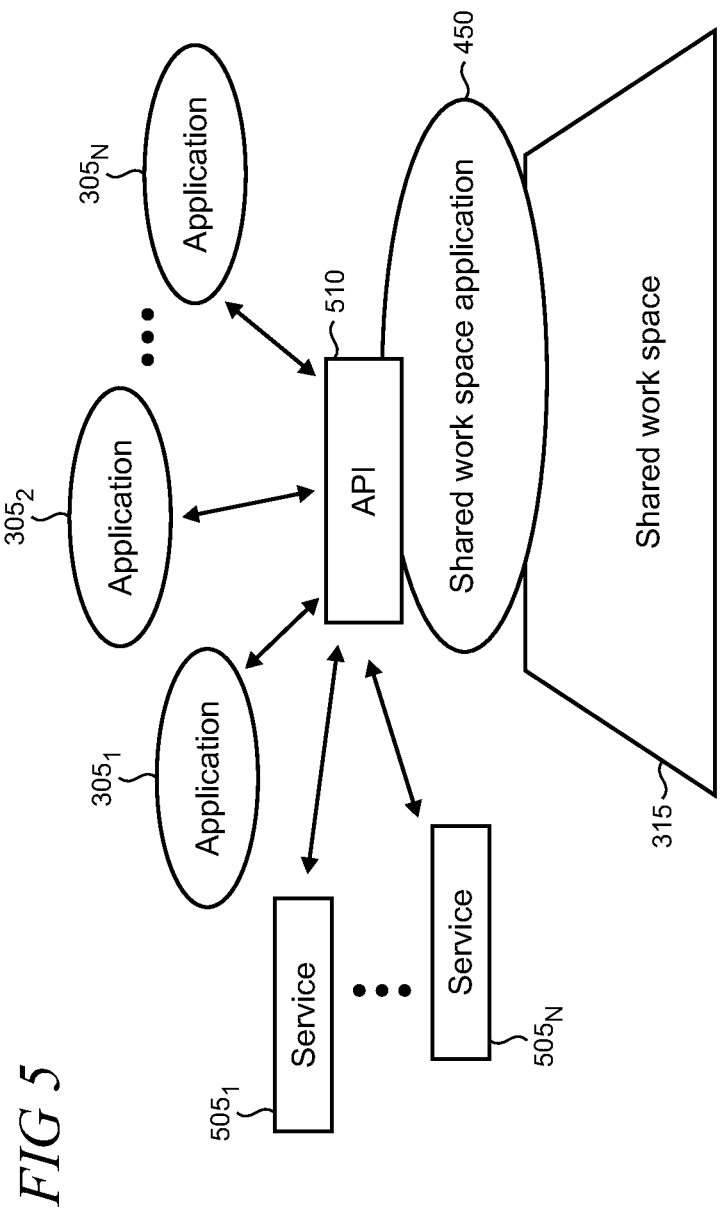
FIG. 5 shows an illustrative application programming interface (API) that may be exposed by a shared work space application to other applications and services.

As shown in FIG. 5, the shared work space application 450 may be configured to interoperate with the other applications 305 that are installed or available on a given device 110. The shared work space application can also be configured to interoperate with services 505. Typically, the shared work space application 450 will expose an application programming interface 510 (API) to the applications and services to support a universal navigation experience through interaction with the shared work space 315.

Figure 6:
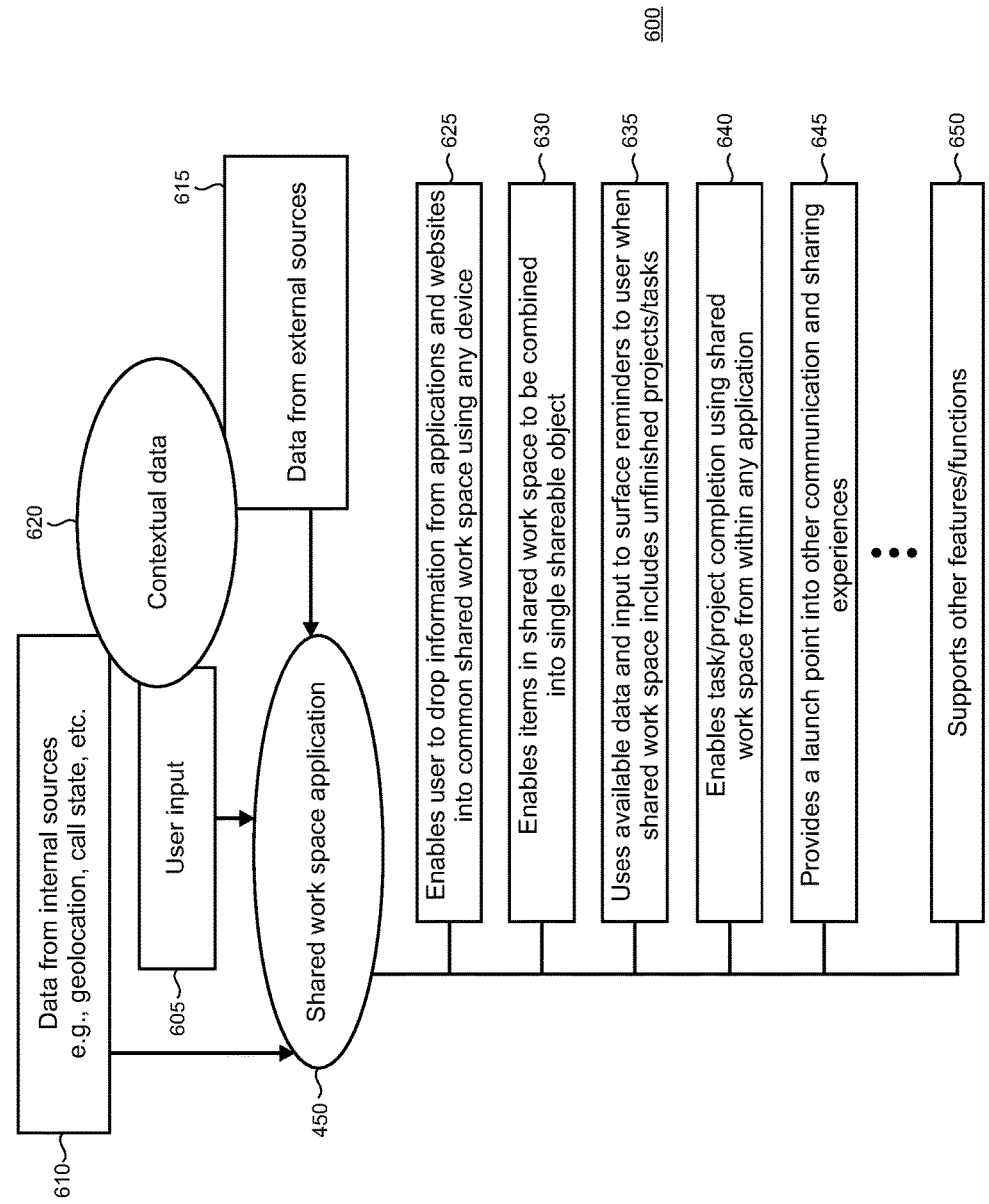
FIG. 6 shows illustrative inputs to a shared work space application and an illustrative taxonomy of features and functions that may be supported by the shared work space application.

FIG. 6 shows an illustrative taxonomy of functions 600 that may be supported in typical implementations of the shared work space application 450. Inputs to the shared work space application 450 may include user input 605, data from internal sources 610, and data from external sources 615. For example, data from internal sources 610 may include the current geolocation of the device 110 that is reported by a GPS (Global Positioning System) component on the device, or some other location-aware component. The externally sourced data 615 includes data provided, for example, by external systems, databases, services, and the like such as the service provider 130 (FIG. 1). The various inputs can be used alone or in various combinations to enable the shared work space application 450 to utilize contextual data 620 when it operates. Contextual data can include, for example, time/date, the user's location, language, schedule, appointments, applications installed on the device and application usage, the user's preferences, the user's behaviors (in which such behaviors may be monitored/tracked with notice to the user and the user's consent) and interactions with applications, stored contacts (including, in some cases, links to a local user's or remote user's social graph such as those maintained by external social media services), call history, messaging history, browsing history, device type, device capabilities, communications network type and/or features/functionalities provided therein, mobile data plan restrictions/limitations, data associated with other parties to a communication (e.g., their schedules, preferences, etc.), enterprise policies, job-related policies, and the like. The examples of context are intended to be illustrative and not exhaustive. Various context types may be combined in some implementations to derive and/or generate other types of context. Contextual data may be sourced locally from processes operating on a given device in some cases, while in other cases some contextual data can be received from external sources. Additional illustrative examples of the use of context by the shared work space application 450 are provided below.

As shown, the functions 600 illustratively include enabling a user to drop information from applications and websites into the commonly shared work space using any device (as indicated by reference numeral 625). The functions 600 may also include enabling items in the shared work space to be combined into a single shareable object (630); using available data and inputs to surface reminders to the user when the shared work space includes one or more items associated with unfinished tasks/projects (635); enabling task/project completion using the shared work space from within any application (640); providing a readily accessible launch point into communication applications and sharing experiences (645); and providing and supporting other features and functionalities (650). The list of functions 600 is illustrative and not intended to be exhaustive and other functions may be provided by the shared work space application to meet the needs of a particular implementation.

FIGS. 7-11 show screen captures of illustrative user interfaces (UIs) displayed on a device 110 at various points during a user's interaction with the shared work space application. It is noted that all the UIs shown in the drawings are intended to be illustrative and that the presentation of information, exposed features and controls, and the overall look and feel of the UI can vary from what is shown by implementation.

Figure 7:
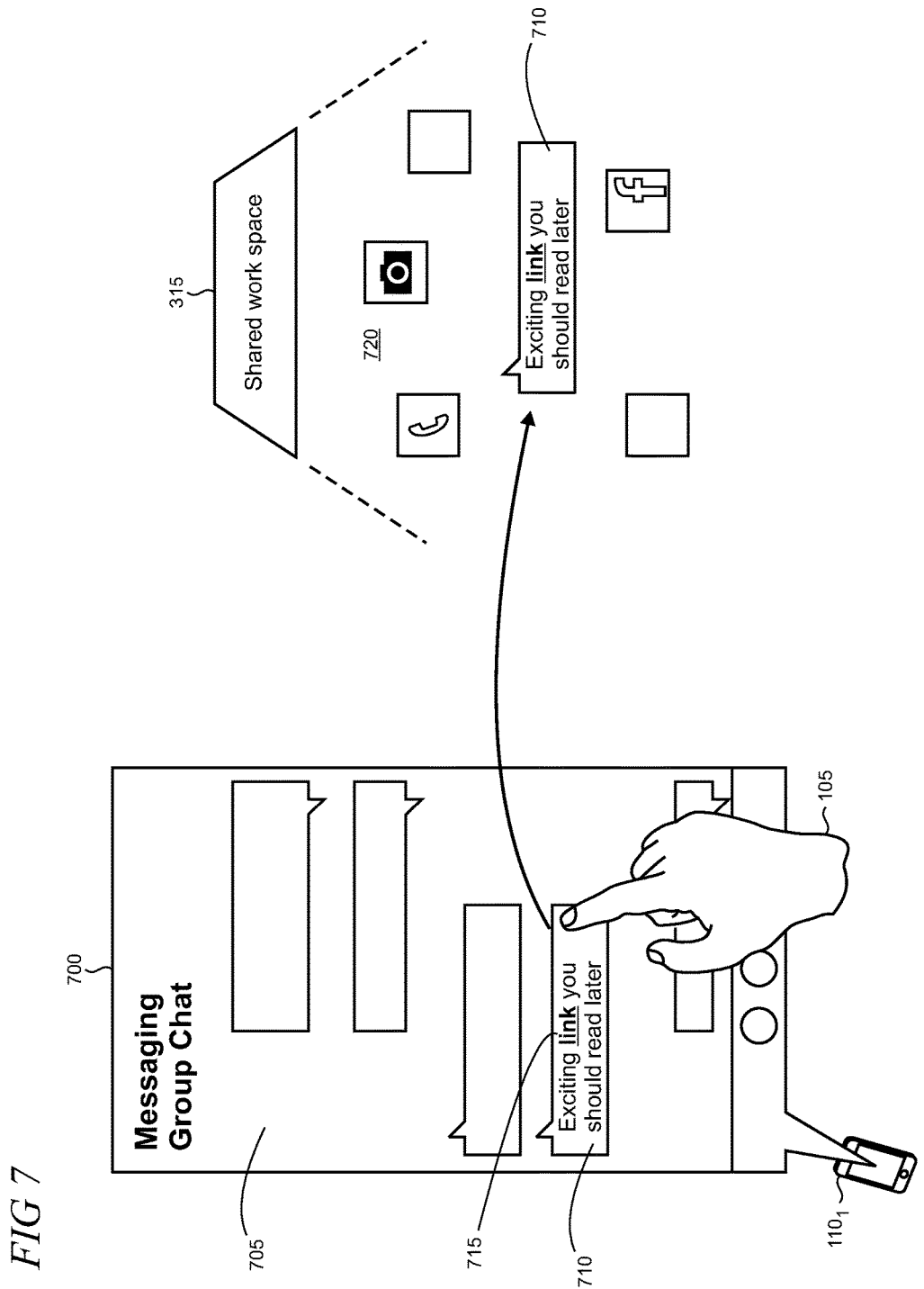
FIGS. 7-11 show screen captures of illustrative user interfaces (UIs) displayed on a device to facilitate the present task completion across devices using a shared work space.

UI 700 in FIG. 7 can be exposed by a messaging application 305 (FIG. 3) running on a smartphone to display a chat card 705 associated with a group chat among the user 105 and contacts 210 (FIG. 2). The chat card 705 shows incoming messages from contacts on the left side and outgoing messages generated by the user on the right side (in which the message content is not shown for sake of clarity in exposition). An incoming message 710 includes a link 715 that can be followed to a resource or other experience such as a page on a shopping website as in the example given above.

The messaging application 305 and the shared work space application 450 (FIG. 4) are configured in this example to interoperate through interactions facilitated by the API 510 (FIG. 5). Accordingly, while engaged in the experience supported by messaging application 305, the user can select an item (i.e., an object that typically represents content, data, and/or an experience) and drop it in the shared work space 315 supported by the shared work space application 450. As shown, the shared work space 315 can simultaneously support multiple items 720 associated with various different applications.

The particular user action that may be utilized to select and drop an item into the shared work space can vary by implementation and device. For example, with devices that have a touch screen and utilize touch-based gestures, the selection and dropping can be configured for invocation by the user using one or more touch gestures that have sufficient uniqueness to be reliably recognized by the applications and/or OS, other system components, touch screen driver, etc. Typically, the user will employ a common gesture across all applications and experiences when selecting and dropping items into the shared work space.

By exposing the features and functions of the work space with a consistent user experience, the shared work space application makes it easy for the user to switch among communication applications when completing a task/project or finishing up a conversation. The shared work space application also enables continuity of a task/project to be maintained when the user starts or restarts working on a task/project and helps to keep track of what has already been handled and what still needs to get done.

Figure 9:
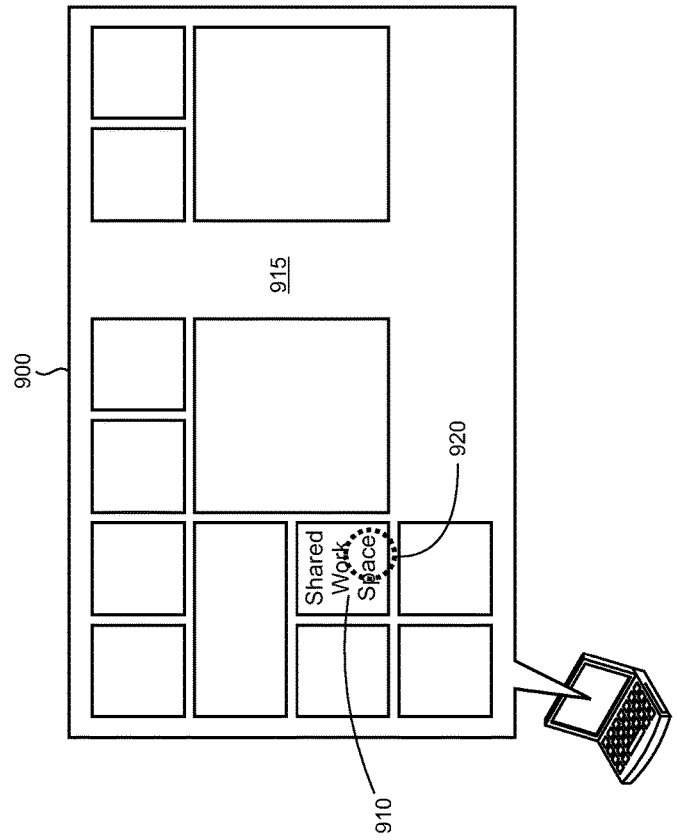
Figure 8:
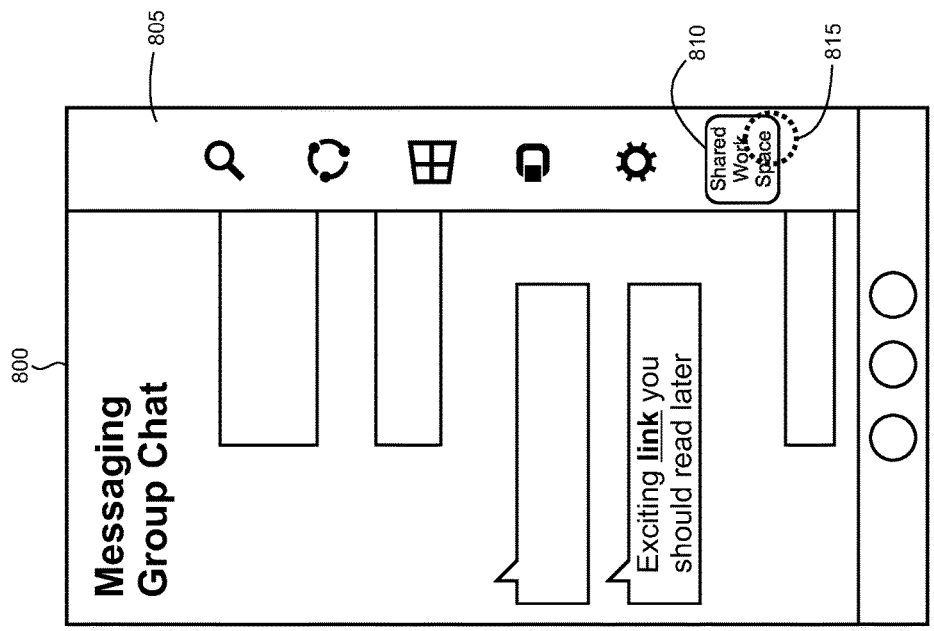
Figure 10:
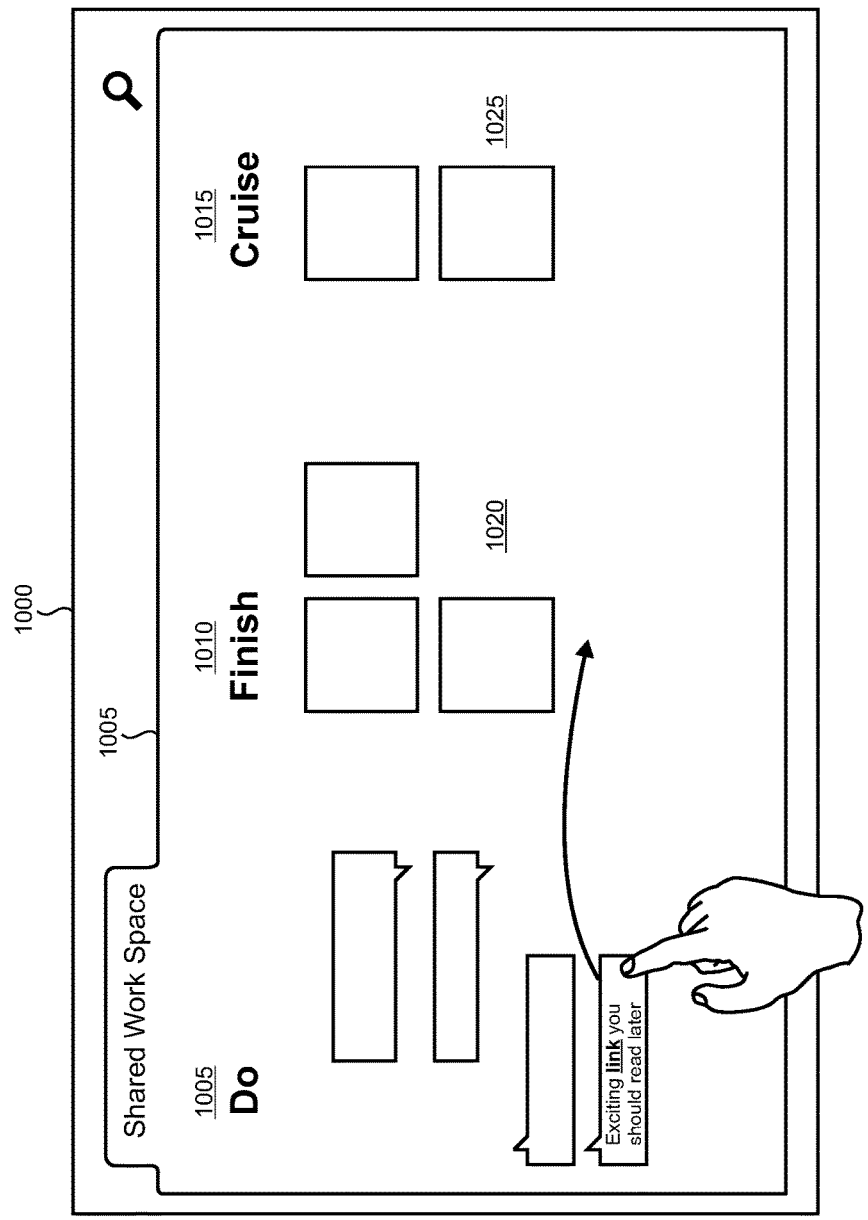

In addition to enabling access to the shared work space from within another application, the shared work space application can also support its own UI. The user can launch the shared work space UI as shown in FIGS. 8 and 9. In FIG. 8, UI 800 shows an illustrative menu 805 that may be called up from within the messaging application that is executing on the smartphone. The menu 805 can expose a launch icon 810 for the shared work space application that the user can invoke, for example, using a touch 815.

On a device such as a PC with a larger display screen, a launch icon 910 can be included, for example, on a start screen 900 along with other tiles 915 representing applications, games, documents, etc. Here, the user has launched the shared work space application with a touch 920 which brings up the UI 1000 shown in FIG. 10. As shown, the shared work space UI can be arranged in portions that are respectively associated with doing activities (as indicated by reference numeral 1005), finishing up with tasks and projects using items that have previously been dropped into the shared work space (1010), and "cruising" (i.e., initiating other experiences using various communication applications) (1015).

In this illustrative example, the "Do" portion 1005 of the UI 1000 is surfacing a messaging experience to the user 105 that is similar to that provided by the messaging application 305 when operated standalone as shown in FIG. 7 and described in the accompanying text. The shared work space application can expose various user controls (not shown) to enable the user to select an application 305 with which to interact from within the shared work space application. In some cases, the particular application that is utilized to launch the work space application (e.g., using button 810 in FIG. 8) can be exposed in the UI by default. Thus, if the messaging application is the last application used prior to launching the shared space application, then the messaging experience will come up in the "Do" portion of the UI 1000. As with the illustrative example above, the user 105 can select and drop an item from the messaging application into the shared work space.

The "Finish" portion 1010 of the UI 1000 may be used as a point for collecting, organizing, and presenting items 1020 associated with uncompleted tasks and projects. As noted above, the items can be of varied types and also be associated with different applications. This UI portion thus functions as a centralized area for activity, or hub, that the user can utilize and rely upon to organize all of her ongoing and unfinished projects in one place.

The "Cruise" portion of the UI 1000 may be used as a launching point for various applications 1025 which typically include communication applications. For example, the user can select and launch an application to complete a messaging conversation with a contact using items from the shared space. The user may also launch applications from the UI even if no task/project is being worked upon, for example when the user has finished them all or when she simply wants to communicate with contacts and/or participate in experiences supported by the applications launched from the UI 1000. In some cases, the user can launch an application, use it, and then return to the shared work space application UI to launch another application that may be needed. In this way, the UI 1000 again functions as a convenient centralized hub for task completion activities that helps the user keep track of the activities and maintain continuity of experiences across task completion sessions.

The shared work space application can utilize inputs and data to automatically populate the "Cruise" portion of the UI 1000 with contextually relevant applications. For example, the populated applications can include those that may be used to finish tasks/projects using the items in the shared work space. Thus, as the items enter and leave the shared work space, the applications populated into the UI 1000 can change in response.

Figure 11:
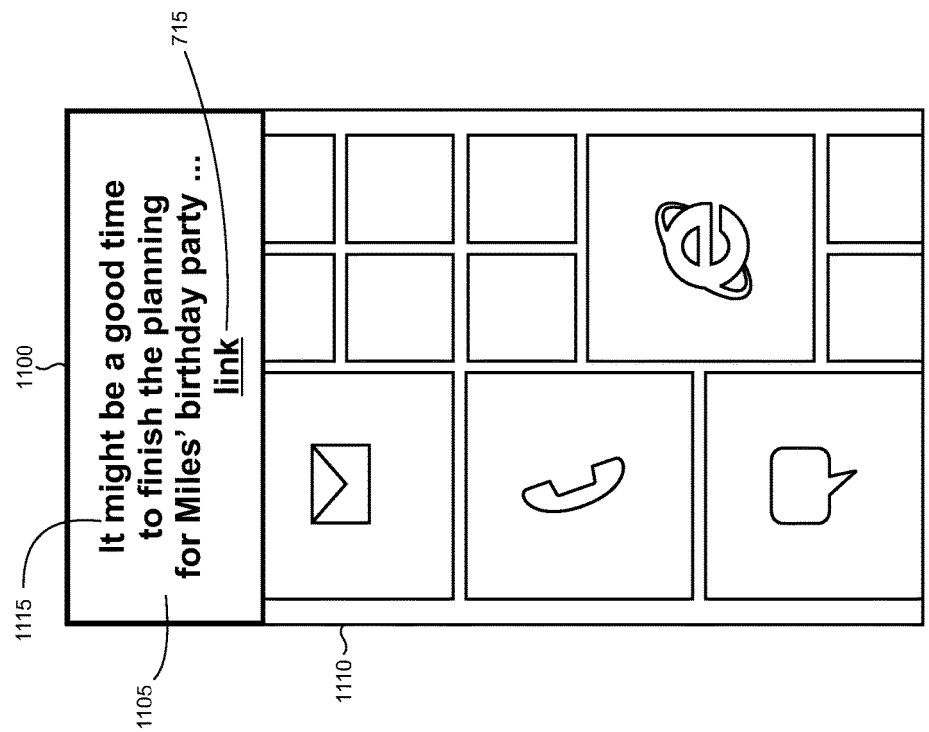

FIG. 11 shows a UI 1100 which shows an illustrative reminder generated by the shared work space application using a notification 1105 that is exposed as a pop-up on the device's start screen 1110. The notification includes a text string 1115 that informs the user of an unfinished task and can typically provide some details to help the user remember what the task is about. As discussed above, the reminder can be generated using contextual data so that it is surfaced on the device at an advantageous time when the user is able to take action using an appropriate device (e.g., has free time and all the needed information/resources to finish the task/project). In some implementations, the notification can include one or more portions of the associated item in the shared work space. For example, as shown in FIG. 11, the notification 1105 includes the product link 715 from the incoming message 710 (FIG. 7).

Figure 12:
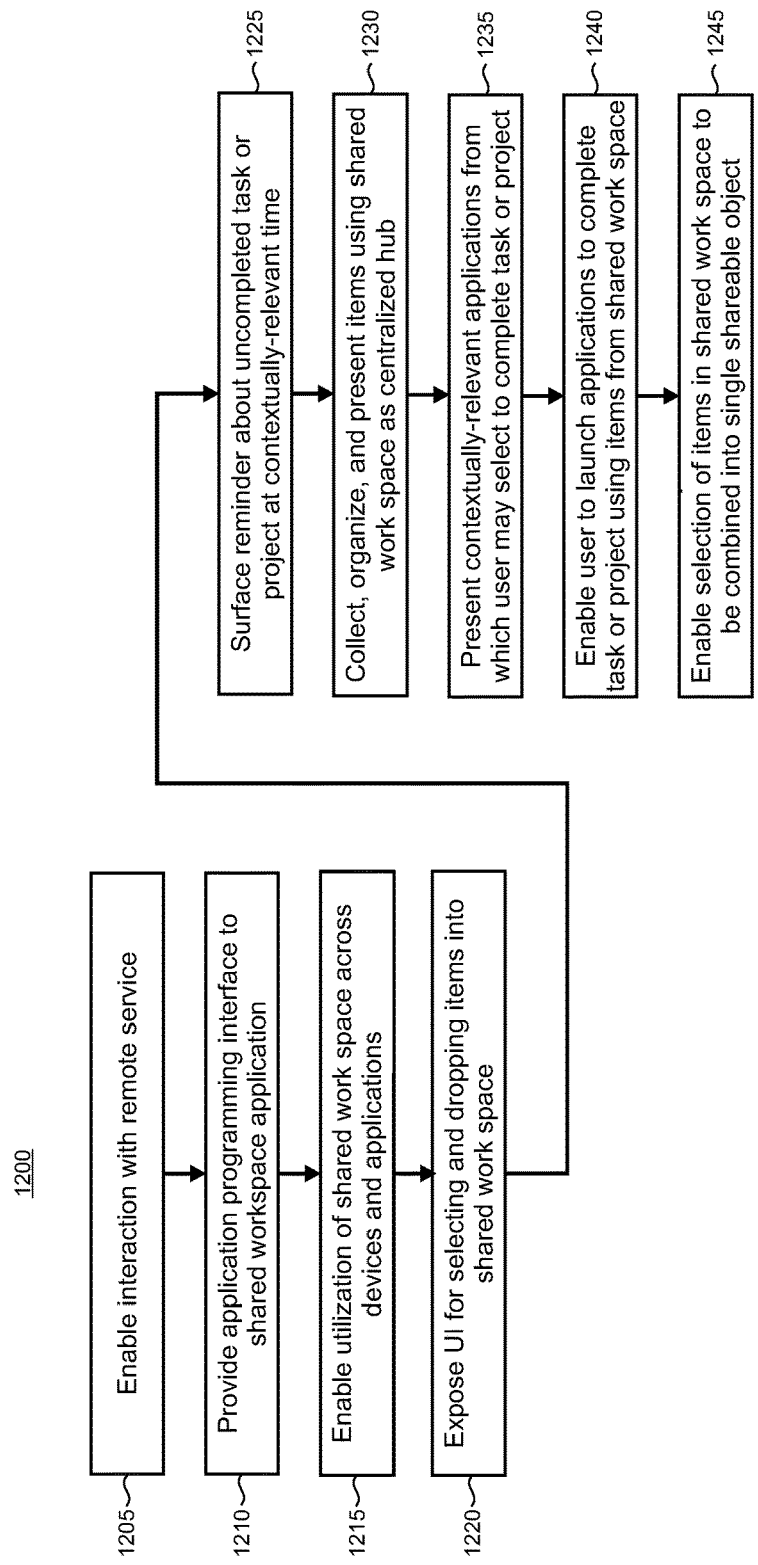
FIGS. 12 and 13 show illustrative methods that may be performed when implementing the present task completion across devices using a shared work space.

FIG. 12 shows a flowchart of an illustrative method 1200 for implementing the present shared work space. Unless specifically stated, the methods or steps shown in the flowcharts below and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, in some implementations, the shared work space application 450 (FIG. 4) can enable interaction with a remote service such as that supported by the service provider 130 in FIG. 1. Such interaction can enable all or parts of a shared work space experience to be provided remotely, for example, using a cloud-based service or some other service. In step 1210, the API 510 (FIG. 5) is provided so that applications 305 (FIG. 3) can interact with the shared work space application 450. Services can also interact with the shared work space application in some cases. The provisioning of the API can typically facilitate cross-application utilization of the shared work space so that the user can resume working on a task/project using different devices and applications, as indicated in step 1215.

A UI is exposed in step 1220 which is configured to enable the user to select and drop items into the shared work space. As discussed above, in some implementations the selection and dropping can be implemented using touch-based gestures. In step 1225, a reminder can be surfaced on the device about uncompleted tasks/projects at a contextually-relevant time or some other optimal time. The reminder is generated using contextual data, as well as other data and inputs in some implementations, so the reminder is surfaced at a time that makes sense for the user.

In step 1230, the shared work space application can collect and present items using the shared work space as a centralized hub. In step 1235, contextually-relevant applications can be populated into and presented using a centralized launch point. Enablement is provided in step 1240 for the user to launch an application to complete a task/project using items from the shared work space. Enablement is provided in step 1245 for the user to select items in the shared work space to be combined into a single shareable object.

Figure 13:
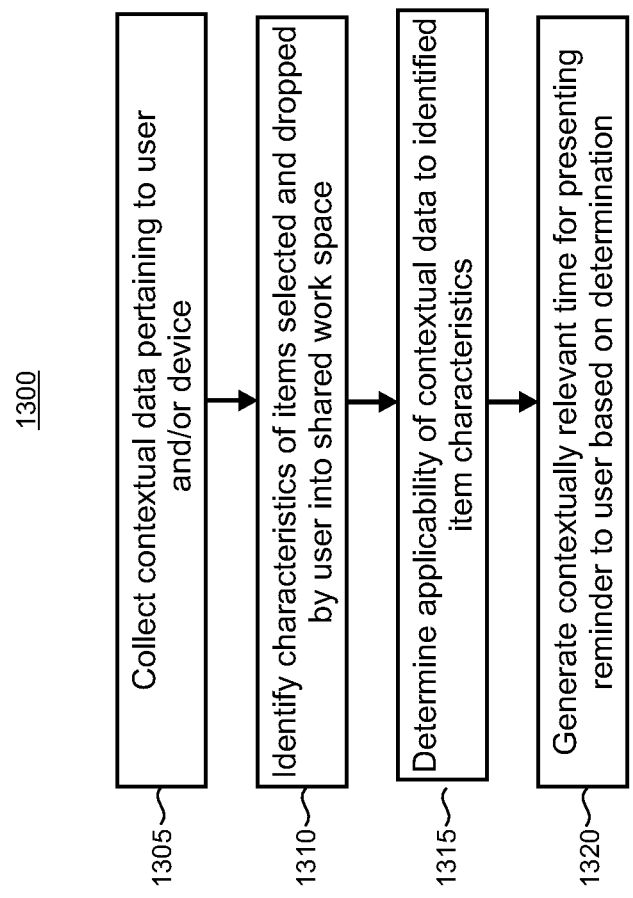

FIG. 13 shows a flowchart of an illustrative method 1300 for generating a reminder at a contextually-relevant time. The method can typically be performed at a local device 110 (FIG. 1), at the remote service provider 130, or using a combination of local and remote processing in some implementations. In step 1305, contextual data is collected which pertains to a user and/or to a device. In some implementations, contextual data can be collected about other people (e.g., the user's contacts) and/or objects (e.g., the contact's devices).

In step 1310, characteristics are identified about items which are selected and dropped into the shared space. For example, the characteristics can include embedded links, item content (e.g., text, graphics, macros, code, etc.), item attributes or metadata (e.g., file size, data, file type, etc.), application association (i.e., which application is typically associated with an item such as messaging, email, social media, etc.), timestamps (e.g., time when a communication is received), relationships to the other items in the shared work space (e.g., sent by a common contact, associated with the same application, etc.), identity of a sending party (e.g., contact), and the like.

In step 1315, a determination can be made about the applicability of collected contextual data to the identified item characteristics. For example, contextual data may indicate that the user regularly uses a tablet having a large display. If an item in the shared work space is an email message which is determined to include a spreadsheet having a large file size, then device type is determined to have applicability to that item. Responsively to that determination, the next time the user employs the tablet which is likely well suited to displaying the larger spreadsheet, the reminder about an uncompleted task using the spreadsheet can be surfaced in step 1320.

Figure 14:
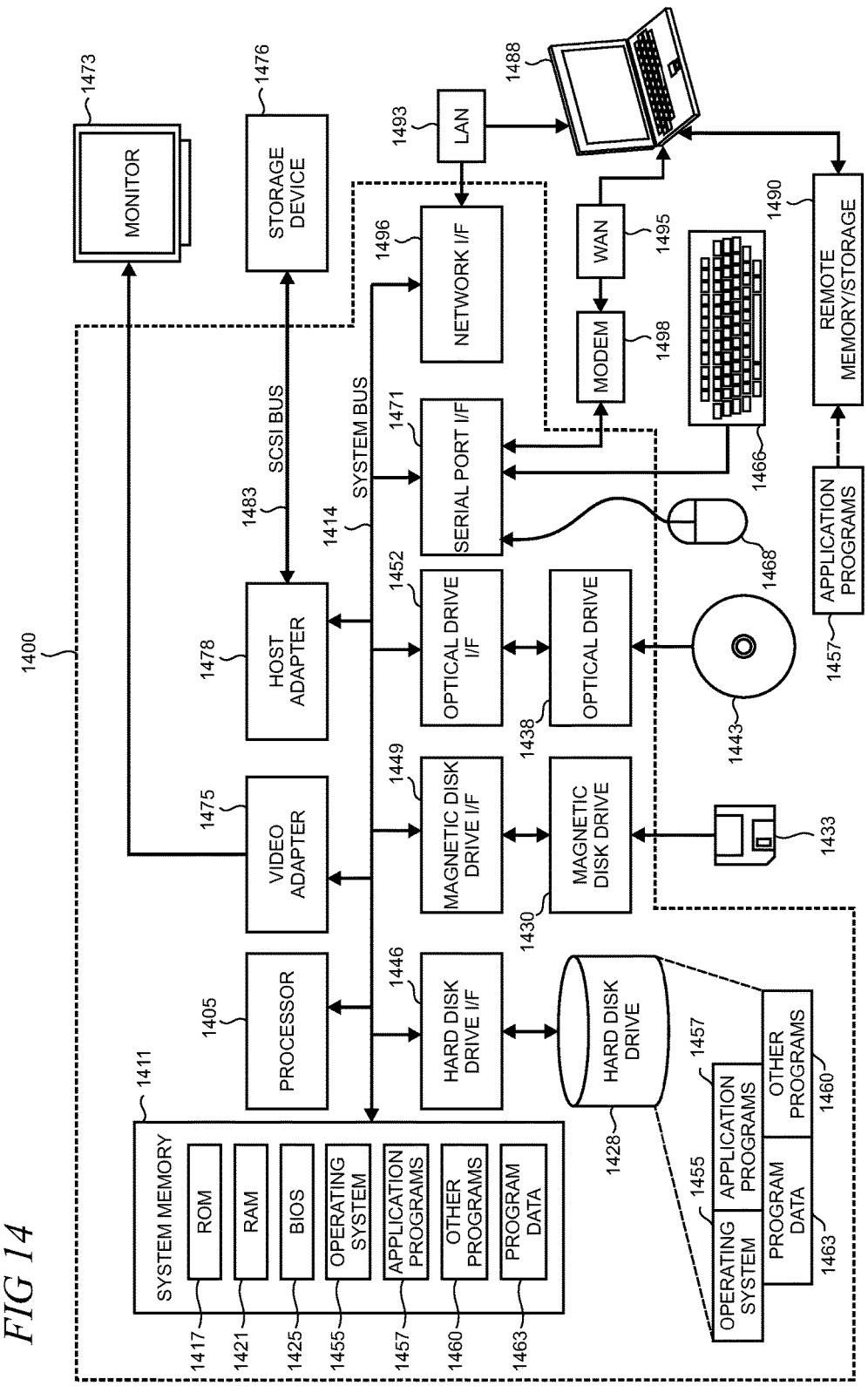
FIG. 14 is a simplified block diagram of an illustrative computer system such as a personal computer (PC) that may be used in part to implement the present task completion across devices using a shared work space.

FIG. 14 is a simplified block diagram of an illustrative computer system 1400 such as a PC, client machine, or server with which the present task completion across devices using a shared work space may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present task completion across devices using a shared work space. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present task completion across devices using a shared work space.

Figure 15:
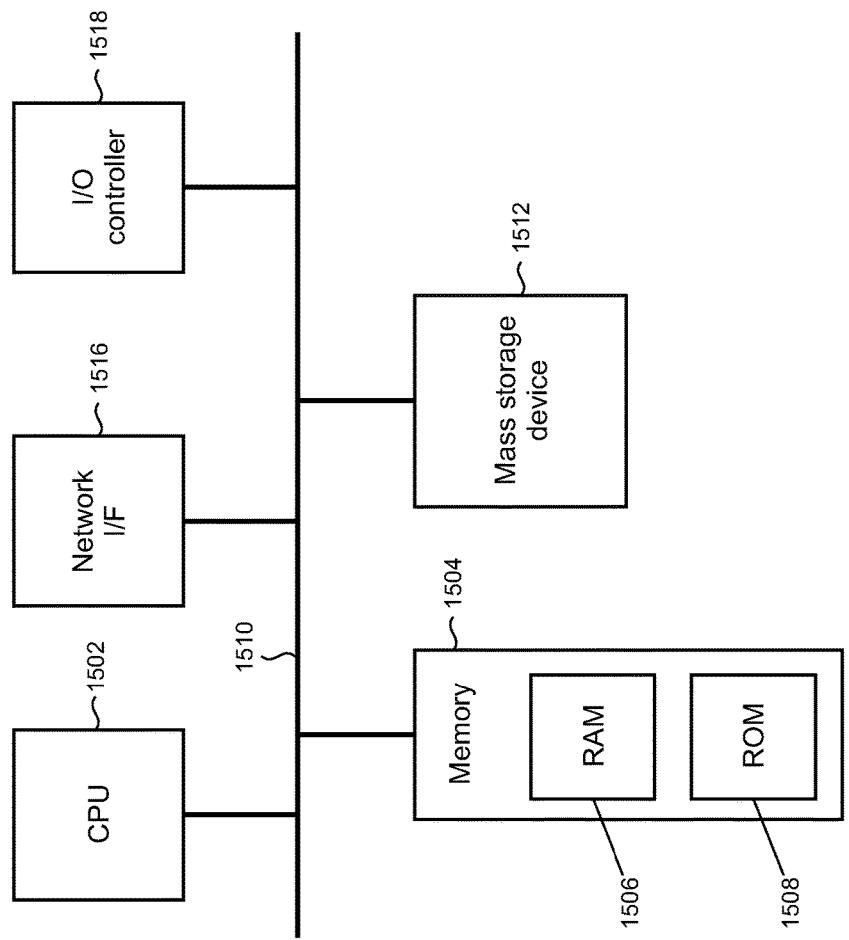
FIG. 15 shows a block diagram of an illustrative device that may be used in part to implement the present task completion across devices using a shared work space.

FIG. 15 shows an illustrative architecture 1500 for a device capable of executing the various components described herein for providing the present task completion across devices using a shared work space. Thus, the architecture 1500 illustrated in FIG. 15 shows an architecture that may be adapted for a server computer, mobile phone, a PDA, a smartphone, a desktop computer, a netbook computer, a tablet computer, GPS device, gaming console, and/or a laptop computer. The architecture 1500 may be utilized to execute any aspect of the components presented herein.

The architecture 1500 illustrated in FIG. 15 includes a CPU (Central Processing Unit) 1502, a system memory 1504, including a RAM 1506 and a ROM 1508, and a system bus 1510 that couples the memory 1504 to the CPU 1502. A basic input/output system containing the basic routines that help to transfer information between elements within the architecture 1500, such as during startup, is stored in the ROM 1508. The architecture 1500 further includes a mass storage device 1512 for storing software code or other computer-executed code that is utilized to implement applications, the file system, and the operating system.

The mass storage device 1512 is connected to the CPU 1502 through a mass storage controller (not shown) connected to the bus 1510. The mass storage device 1512 and its associated computer-readable storage media provide non-volatile storage for the architecture 1500.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, or electronic stylus (not shown in FIG. 15). Similarly, the input/output controller 1518 may provide output to a display screen, a printer, or other type of output device (also not shown in FIG. 15).

It may be appreciated that the software components described herein may, when loaded into the CPU 1502 and executed, transform the CPU 1502 and the overall architecture 1500 from a general-purpose computing system into a special-purpose computing system customized to facilitate the functionality presented herein. The CPU 1502 may be constructed from any number of transistors or other discrete circuit elements, which may individually or collectively assume any number of states. More specifically, the CPU 1502 may operate as a finite-state machine, in response to executable instructions contained within the software modules disclosed herein. These computer-executable instructions may transform the CPU 1502 by specifying how the CPU 1502 transitions between states, thereby transforming the transistors or other discrete hardware elements constituting the CPU 1502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1500 in order to store and execute the software components presented herein. It may also be appreciated that the architecture 1500 may include other types of computing devices, including handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Figure 16:
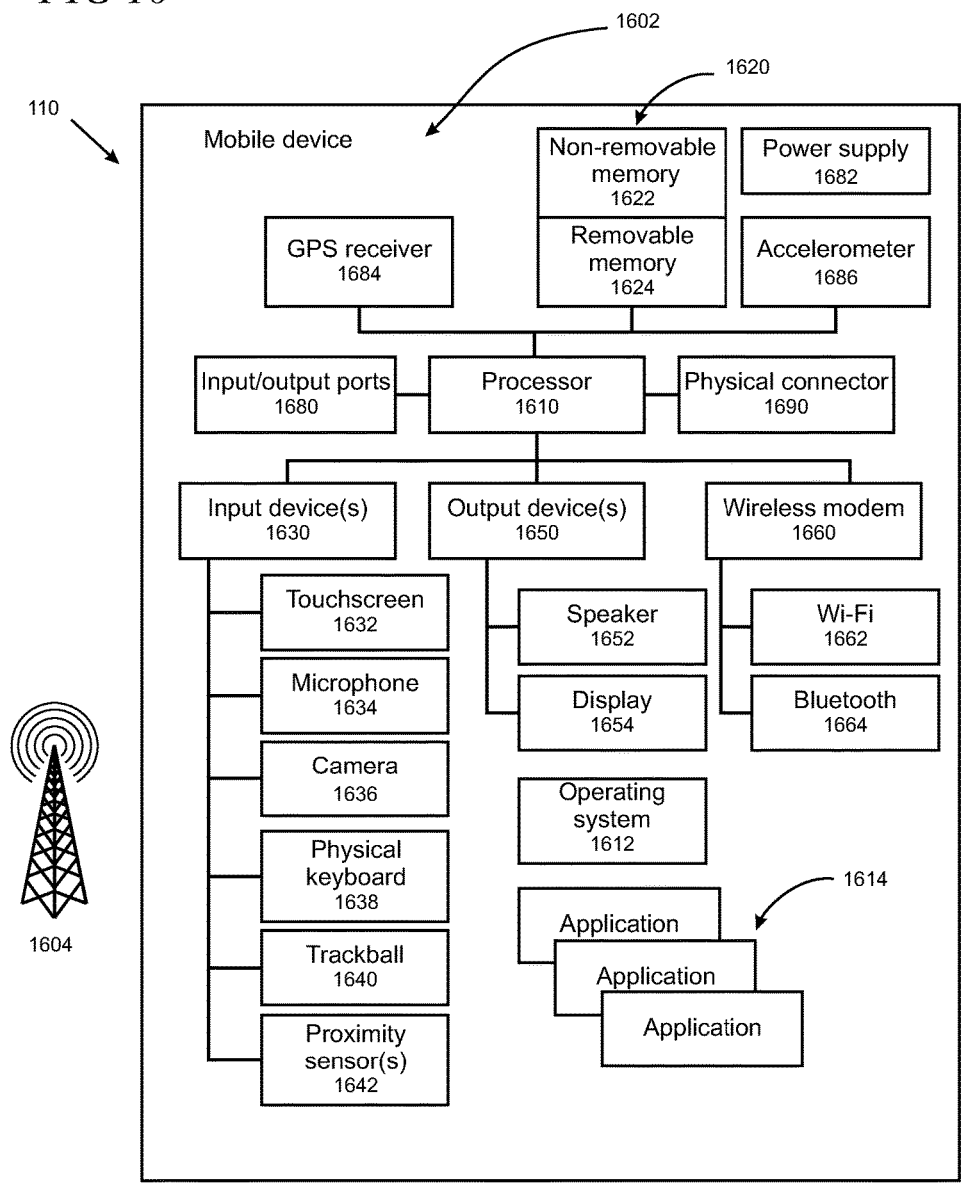
FIG. 16 is a block diagram of an illustrative mobile device.

FIG. 16 is a functional block diagram of an illustrative mobile device 110 such as a mobile phone or smartphone including a variety of optional hardware and software components, shown generally at 1602. Any component 1602 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1604, such as a cellular or satellite network.

The illustrated device 110 can include a controller or processor 1610 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1612 can control the allocation and usage of the components 1602, including power states, above-lock states, and below-lock states, and provides support for one or more application programs 1614. The application programs can include common mobile computing applications (e.g., image-capture applications, email applications, calendars, contact managers, web browsers, messaging applications), or any other computing application.

The illustrated mobile device 110 can include memory 1620. Memory 1620 can include non-removable memory 1622 and/or removable memory 1624. The non-removable memory 1622 can include RAM, ROM, Flash memory, a hard disk, or other well-known memory storage technologies. The removable memory 1624 can include Flash memory or a Subscriber Identity Module (SIM) card, which is well known in GSM (Global System for Mobile communications) systems, or other well-known memory storage technologies, such as "smart cards." The memory 1620 can be used for storing data and/or code for running the operating system 1612 and the application programs 1614. Example data can include web pages, text, images, sound files, video data, or other data sets to be sent to and/or received from one or more network servers or other devices via one or more wired or wireless networks.

The memory 1620 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1630, such as a touch screen 1632; microphone 1634 for implementation of voice input for voice recognition, voice commands and the like; camera 1636; physical keyboard 1638; trackball 1640; and/or proximity sensor 1642; and one or more output devices 1650, such as a speaker 1652 and one or more displays 1654. Other input devices (not shown) using gesture recognition may also be utilized in some cases. Other possible output devices (not shown) can include piezoelectric or haptic output devices. Some devices can serve more than one input/output function. For example, touchscreen 1632 and display 1654 can be combined into a single input/output device.

A wireless modem 1660 can be coupled to an antenna (not shown) and can support two-way communications between the processor 1610 and external devices, as is well understood in the art. The modem 1660 is shown generically and can include a cellular modem for communicating with the mobile communication network 1604 and/or other radio-based modems (e.g., Bluetooth 1664 or Wi-Fi 1662). The wireless modem 1660 is typically configured for communication with one or more cellular networks, such as a GSM network for data and voice communications within a single cellular network, between cellular networks, or between the mobile device and a public switched telephone network (PSTN).

The mobile device can further include at least one input/output port 1680, a power supply 1682, a satellite navigation system receiver 1684, such as a GPS receiver, an accelerometer 1686, a gyroscope (not shown), and/or a physical connector 1690, which can be a USB port, IEEE 1394 (FireWire) port, and/or an RS-232 port. The illustrated components 1602 are not required or all-inclusive, as any components can be deleted and other components can be added.

Figure 17:
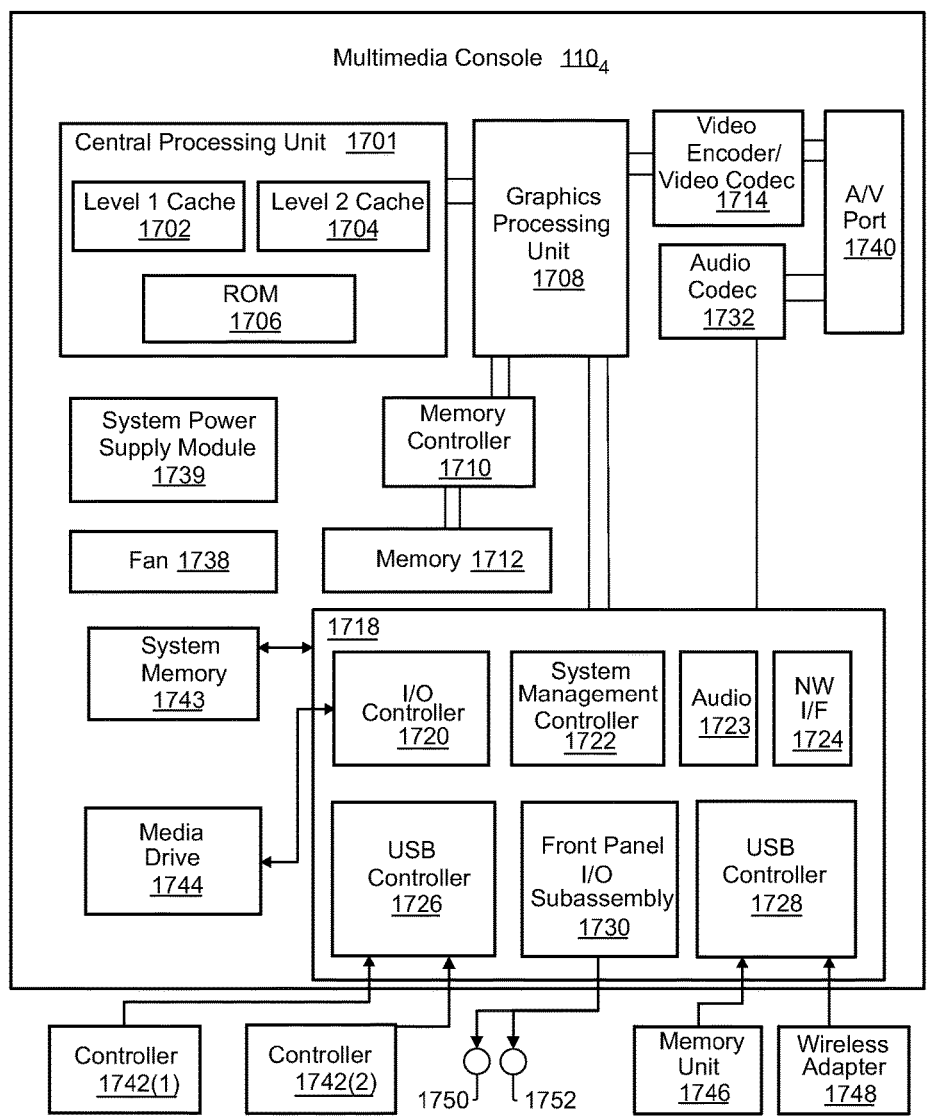
FIG. 17 is a block diagram of an illustrative multimedia console.

FIG. 17 is an illustrative functional block diagram of a multimedia console 110$_4$. The multimedia console 110$_4$ has a central processing unit (CPU) 1701 having a level 1 cache 1702, a level 2 cache 1704, and a Flash ROM (Read Only Memory) 1706. The level 1 cache 1702 and the level 2 cache 1704 temporarily store data and hence reduce the number of memory access cycles, thereby improving processing speed and throughput. The CPU 1701 may be configured with more than one core, and thus, additional level 1 and level 2 caches 1702 and 1704. The Flash ROM 1706 may store executable code that is loaded during an initial phase of a boot process when the multimedia console 110$_4$ is powered ON.

A graphics processing unit (GPU) 1708 and a video encoder/video codec (coder/decoder) 1714 form a video processing pipeline for high speed and high resolution graphics processing. Data is carried from the GPU 1708 to the video encoder/video codec 1714 via a bus. The video processing pipeline outputs data to an A/V (audio/video) port 1740 for transmission to a television or other display. A memory controller 1710 is connected to the GPU 1708 to facilitate processor access to various types of memory 1712, such as, but not limited to, a RAM.

The multimedia console 110$_4$ includes an I/O controller 1720, a system management controller 1722, an audio processing unit 1723, a network interface controller 1724, a first USB (Universal Serial Bus) host controller 1726, a second USB controller 1728, and a front panel I/O subassembly 1730 that are preferably implemented on a module 1718. The USB controllers 1726 and 1728 serve as hosts for peripheral controllers 1742(1) and 1742(2), a wireless adapter 1748, and an external memory device 1746 (e.g., Flash memory, external CD/DVD ROM drive, removable media, etc.). The network interface controller 1724 and/or wireless adapter 1748 provide access to a network (e.g., the Internet, home network, etc.) and may be any of a wide variety of various wired or wireless adapter components including an Ethernet card, a modem, a Bluetooth module, a cable modem, or the like.

System memory 1743 is provided to store application data that is loaded during the boot process. A media drive 1744 is provided and may comprise a DVD/CD drive, hard drive, or other removable media drive, etc. The media drive 1744 may be internal or external to the multimedia console $110_4$. Application data may be accessed via the media drive 1744 for execution, playback, etc. by the multimedia console $110_4$. The media drive 1744 is connected to the I/O controller 1720 via a bus, such as a Serial ATA bus or other high speed connection (e.g., IEEE 1394).

The system management controller 1722 provides a variety of service functions related to assuring availability of the multimedia console $110_4$. The audio processing unit 1723 and an audio codec 1732 form a corresponding audio processing pipeline with high fidelity and stereo processing. Audio data is carried between the audio processing unit 1723 and the audio codec 1732 via a communication link. The audio processing pipeline outputs data to the A/V port 1740 for reproduction by an external audio player or device having audio capabilities.

The front panel I/O subassembly 1730 supports the functionality of the power button 1750 and the eject button 1752, as well as any LEDs (light emitting diodes) or other indicators exposed on the outer surface of the multimedia console $110_4$. A system power supply module 1739 provides power to the components of the multimedia console $110_4$. A fan 1738 cools the circuitry within the multimedia console $110_4$.

The CPU 1701, GPU 1708, memory controller 1710, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 1743 into memory 1712 and/or caches 1702 and 1704 and executed on the CPU 1701. The application may present a graphical user interface that provides a consistent user experience when navigating to different media types available on the multimedia console $110_4$. In operation, applications and/or other media contained within the media drive 1744 may be launched or played from the media drive 1744 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 1724 or the wireless adapter 1748, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1701 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1742(1) and 1742(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Based on the foregoing, it may be appreciated that technologies for task completion across devices using a shared work space have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present task completion across devices using a shared work space, which is set forth in the following claims.

What is claimed:

1. One or more computer-readable memory devices not consisting of waves, signals, propagated signals, or other intangible communication media storing instructions which, when executed by one or more processors disposed in a device having communications capabilities over a network, implement a method for enabling a user to drop an item into a shared work space, comprising:

exposing a user interface (UI) that displays an in-use application and the shared work space, the shared work space being configured for access by one or more different devices using one or more different applications;

receiving a selection of the item associated with a task or project within the in-use application to be dropped into the shared work space, the item being one or more of content, data, or a link, wherein the shared work space is configured to display items based on particular types of tasks to be performed for the respective item including tasks to be undertaken, and tasks that are uncompleted, and a section of the shared work space is configured to automatically populate with one or more applications for use or completion of an uncompleted task or project;

dynamically selecting the one or more applications for automated population, the selecting being dependent on a current distribution of items to be undertaken and items that remain uncompleted in the shared work space, in which each of the selected one or more applications identifies a launching point within the application so that continuity of user experiences is maintained across shared work space sessions;

displaying the selected one or more applications on the UI, wherein the items within the shared work space are combinable into a single object that is shareable with other devices and enables re-creation of experiences associated with each of the combined items;

collecting contextual data pertaining to the device or the user, wherein the contextual data includes the user's location or a time of day;

identifying characteristics of the item selected and dropped by the user into the shared work space that is accessible by one or more devices using one or more applications;

determining applicability of one or more pieces of collected contextual data to the identified characteristics;

generating a contextually-relevant time to present a reminder based on the determination; and enabling the user to work on the task or project using the displayed one or more applications and the item in the shared work space.

2. The one or more computer-readable memory devices of claim 1 further comprising generating the reminder using contextual data that includes one or more of stored contacts, device user behavior, links to the device user's social graph, call history, messaging history, browser history, device characteristics, communications network type, mobile data plans, mobile data plan restrictions, enterprise policies, job-related policies, user preferences, time/date, language, or appointments.

3. The one or more computer-readable memory devices of claim 1 further including enabling the user to launch an application to complete a task or project using the item from the shared work space.

4. The one or more computer-readable memory devices of claim 1 further including presenting applications for launch that are contextually-related to one or more items in the shared work space.

5. The one or more computer-readable memory devices of claim 4 further including exposing an application programming interface to the launchable-applications.

6. The one or more computer-readable memory devices of claim 1 further including sharing the single object over the network.

7. The one or more computer-readable memory devices of claim 1 further including enabling the selection and dropping to be performed using one or more touch-based gestures.

8. The one or more computer-readable memory devices of claim 1 further including interacting with a remote shared work space service.

9. The one or more computer-readable memory devices of claim 1 further including configuring the reminder as a notification that is displayed on the device's UI.

10. A system, comprising:

one or more processors;

a display that supports a user interface (UI) for interacting with a device user; a touch-based input sub-system; and a memory storing computer-readable instructions which, when executed by the one or more processors, perform a method for working on a task or project across devices and applications, the method comprising the steps of:

providing a facility for the user to select and drop an item associated with the task or project for later handling into a shared work space, the item being one or more of content, data, or a link, wherein the shared workspace is configured to display items based on particular types of tasks to be performed for the respective item including tasks to be undertaken, and tasks that are uncompleted, the selection and dropping being performed using a gesture on the touch-based input subsystem, the facility being exposed within experiences supported on the device outside the shared work space, and the shared work space is configured to display items based on particular types of tasks to be performed for the respective item including tasks to be undertaken, and tasks that are uncompleted;

dynamically selecting one or more applications for automated population, the selecting being dependent on a current distribution of items to be undertaken and items that remain uncompleted in the shared work space, in which each of the selected one or more applications identifies a launching point within the application so that continuity of user experiences is maintained across shared work space sessions;

displaying the selected one or more applications on the UI, wherein the items within the shared work space are combinable into a single object that is shareable with other devices and enables re-creation of experiences associated with each of the combined items;

collecting contextual data pertaining to the device or the user, wherein the contextual data includes the user's location or a time of day;

identifying characteristics of the item selected and dropped by the user into the shared work space that is accessible by one or more devices using one or more applications;

determining applicability of one or more pieces of collected contextual data to the identified characteristics;

generating a contextually-relevant time to present a reminder based on the determination; and enabling the user to work on the task or project using the displayed one or more applications and the item in the shared work space.

11. The system of claim 10 in which the shared work space is invoked from within the applications.

12. The system of claim 10 further comprising configuring the UI to support a user experience supported by the applications.

13. A method for generating a reminder of an unfinished task or project that is presented on a device employed by a user, the method comprising the steps of:

responsive to a user request, exposing a menu on a user interface (UI) within an in-use application;

exposing a launch icon located within the menu displayed within the in-use application, the launch icon being configured to direct the user to a shared work space upon selection of the launch icon;

receiving a first selection of the launch icon to open the shared work space;

after opening the shared work space, receiving a second selection of an item to be dropped into the shared work space, wherein the shared work space is configured to display items based on particular types of tasks to be performed for the respective item including tasks to be undertaken, and tasks that are uncompleted, the items being one or more of content, data, or links:

dynamically selecting one or more applications for automated population, the selecting being dependent on a current distribution of items to be undertaken and items that remain uncompleted in the shared work space, in which each of the selected one or more applications identifies a launching point within the application so that continuity of user experiences is maintained across shared work space sessions;

displaying the selected one or more applications on the UI, wherein the items within the shared work space are combinable into a single object that is shareable with other devices and enables re-creation of experiences associated with each of the combined items;

collecting contextual information pertaining to the device or the user, wherein the contextual information includes the user's location or a time of day;

identifying characteristics of the item selected and dropped by the user into the shared work space that is accessible by one or more devices using one or more applications;

determining applicability of one or more pieces of collected contextual information to the identified characteristics; and generating a contextually-relevant time to present the reminder based on the determination; and enabling the user to work on the task or project using the displayed one or more applications and the item in the shared work space.

14. The method of claim 13 in which the contextual information includes one or more of device type, application usage on the device, device user's schedule, or device user's location, contacts, device user's behavior, device user's social graph, call history, messaging history, browser history, device characteristics, communications network type, mobile data plans, mobile data plan restrictions, enterprise policies, job-related policies, user preferences, time/date, language, or appointments.

15. The method of claim 13 in which the item is associated with a communication sent by a contact of the user.

16. The method of claim 15 in which the identified characteristics include one or more of embedded links, item content, item attributes, item metadata, an application that is associated with the item, relationships to other items in the shared work space, time when the communication is received, or identity of sending contact.

* * * * *